US008322496B2

(12) United States Patent
Jung

(10) Patent No.: US 8,322,496 B2
(45) Date of Patent: Dec. 4, 2012

(54) MECHANICAL DRUM BRAKE

(75) Inventor: Hoe Do Jung, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 0 days.

(21) Appl. No.: 12/956,935

(22) Filed: Nov. 30, 2010

(65) Prior Publication Data

US 2011/0127130 A1    Jun. 2, 2011

(30) Foreign Application Priority Data

Nov. 30, 2009   (KR) .................. 10-2009-0116775

(51) Int. Cl.
*F16D 51/00* (2006.01)

(52) U.S. Cl. .................................. 188/79.64

(58) Field of Classification Search .......... 188/325, 188/79.51–79.64
See application file for complete search history.

(56) References Cited

U.S. PATENT DOCUMENTS

| 3,295,638 | A | * | 1/1967 | Bauman ..................... 188/79.56 |
| 5,067,596 | A | * | 11/1991 | Johannesen ............... 188/79.54 |
| 6,397,984 | B1 | * | 6/2002 | De Andreis et al. ....... 188/79.52 |
| 6,691,838 | B2 | * | 2/2004 | Wang ......................... 188/79.51 |
| 7,258,207 | B2 | * | 8/2007 | Ohnishi et al. ............. 188/79.52 |
| 2004/0069577 | A1 | * | 4/2004 | Girini et al. ................ 188/79.51 |
| 2004/0245059 | A1 | * | 12/2004 | Maehara et al. ............. 188/325 |
| 2006/0144658 | A1 | * | 7/2006 | Tessitore et al. ............. 188/325 |
| 2008/0067020 | A1 | * | 3/2008 | Barbosa et al. ............... 188/325 |

FOREIGN PATENT DOCUMENTS

JP    1-116327    5/1989

OTHER PUBLICATIONS

Chinese Office Action, and English translation thereof, issued in Chinese Patent Application No. 2010-10621506.6 dated Jul. 4, 2012.

* cited by examiner

*Primary Examiner* — Bradley King
*Assistant Examiner* — Vishal Sahni
(74) *Attorney, Agent, or Firm* — McDermott Will & Emery LLP

(57) ABSTRACT

Disclosed is a mechanical drum brake capable of returning brake shoes into the initial position thereof when the braking operation is released. In the mechanical drum, the brake shoes are smoothly returned to the initial position thereof due to leaf springs, which are fixed to the back plate and interpose an adjusting nut of an adjuster therebetween, when braking is released.

4 Claims, 3 Drawing Sheets

PRIOR ART

MECHANICAL DRUM BRAKE

CROSS-REFERENCE TO RELATED APPLICATIONS

This application claims the benefit of Korean Patent Application No. 10-2009-0116775, filed on Nov. 30, 2009, in the Korean Intellectual Property Office, the disclosure of which is incorporated herein by reference.

BACKGROUND

1. Field

The disclosure relates to a mechanical drum brake, and more particularly to a mechanical drum brake capable of smoothly returning brake shoes to the initial position thereof when braking is released.

2. Description of the Related Art

In general, a mechanical drum brake provides braking force by causing friction between a brake shoe with linings and a drum by using a cable linked with a parking brake lever.

When such a mechanical drum brake is used as a parking brake of a vehicle, the mechanical drum brake is paired with a disc brake to brake a rear wheel through hydraulic pressure, called a DIH (Drum In Hat) type.

As shown in FIG. 1, the mechanical drum brake includes a back plate 2 coupled with a vehicle body and a pair of brake shoes 3a and 3b operating outward by an actuation lever 10, which is described later, such that a drum 1 rotating together with a wheel is restricted at the front of the back plate 2.

The brake shoes 3a and 3b having linings 6a and 6b attached thereto are rubbed against an inner circumferential surface of a drum 1 to generate braking force in braking. The brake shoes 3a and 3b are classified into the primary shoe 3a, which is provided in a forward-rotation direction of the drum 1, and the secondary shoe 3b, which is opposite to the primary shoe 3a, about an anchor pin 7.

The brake shoes 3a and 3b include rims 5a and 5b having a semicircular shape having the linings 6a and 6b attached thereto and webs 4a and 4b coupled with inner circumferential surfaces of the rims 5a and 5b to support the rims 5a and 5b. In this case, the webs 4a and 4b of the brake shoes 3a and 3b have one end supported by the anchor pin 7 while making contact with the anchor pin 7 and an opposite end supported by an adjuster 9 while making contact with the adjuster 9.

The adjuster 9 connects the opposition ends of the primary shoe 3a and the secondary shoe 3b with each other and compensates for the increase of the gap between the linings 6a and 6b and the internal circumferential surface of the drum 1 caused by the abrasion of the linings 6a and 6b due to the continuous braking.

Conventionally, when the brake is operated, braking force of the primary shoe 3a making contact with the anchor pin 7 and the secondary shoe 3b making contact with the adjuster 9 is maximized.

The two brake shoes 3a and 3b intend to rotate in one direction upon the braking operation, so the brake shoes 3a and 3b are biased toward the secondary shoe 3b.

Accordingly, after the braking has been released, the primary and secondary shoes 3a and 3b are returned to the initial positions thereof with respect to the anchor pin 7. However, the positions of the first and second shoes 3a and 3b are returned in a state in which the positions are biased to the side of the secondary shoe 3b. Therefore, the smooth position returning is not achieved.

SUMMARY

Accordingly, it is an aspect of the disclosure to provide a mechanical drum brake, in which two brake shoes can be smoothly returned to the initial position thereof after a braking operation has been released.

Additional aspects and/or advantages of the disclosure will be set forth in part in the description which follows and, in part, will be apparent from the description, or may be learned by practice of the disclosure.

The foregoing and/or other aspects of the disclosure are achieved by providing a mechanical drum brake.

The mechanical drum brake includes a back plate coupled with a body of a vehicle, a drum provided in opposition to the back plate and rotating together with a wheel, brake shoes including primary and secondary shoes having linings attached thereto to make contact with an inner circumferential surface of the drum, thereby performing a braking operation, an actuation lever pushing the primary and secondary shoes to an inner surface of the drum if a parking cable is pulled, a return spring to return two brake shoes when the braking operation is released, an adjuster coupled between the primary shoe and the secondary shoe, and an elastic member to return the two brake shoes together with the return spring when the braking operation is released.

The adjuster includes an adjusting nut rotated by the actuation lever to maintain a gap between the lining and the inner surface of the drum at a predetermined interval.

The elastic member includes a first member fixed to the back plate and second and third members extending from both ends of the first member and facing each other while interposing the adjusting nut between the second and third members.

The elastic member is a leaf spring.

As described above, according to the mechanical drum brake according to the present invention, the brake shoes can be smoothly returned to the initial position thereof due to leaf springs, which are fixed to the back plate and interpose an adjusting nut of an adjuster therebetween, when braking is released.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
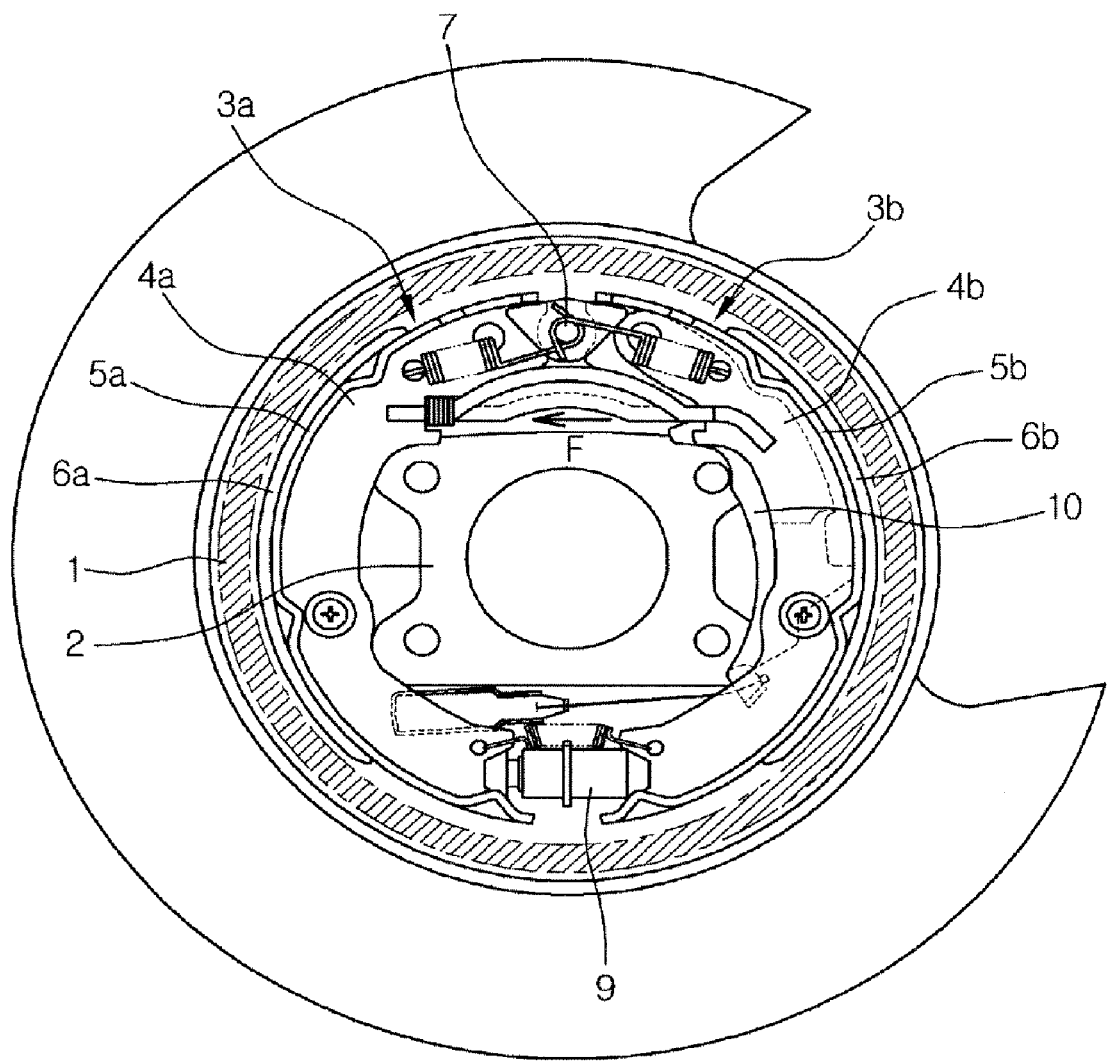
FIG. 1 is a view showing a conventional mechanical drum brake.

Reference will now be made in detail to the embodiments, examples of which are illustrated in the accompanying drawings, wherein like reference numerals refer to the like elements throughout. The embodiments are described below to explain the disclosure by referring to the figures.

Figure 2:
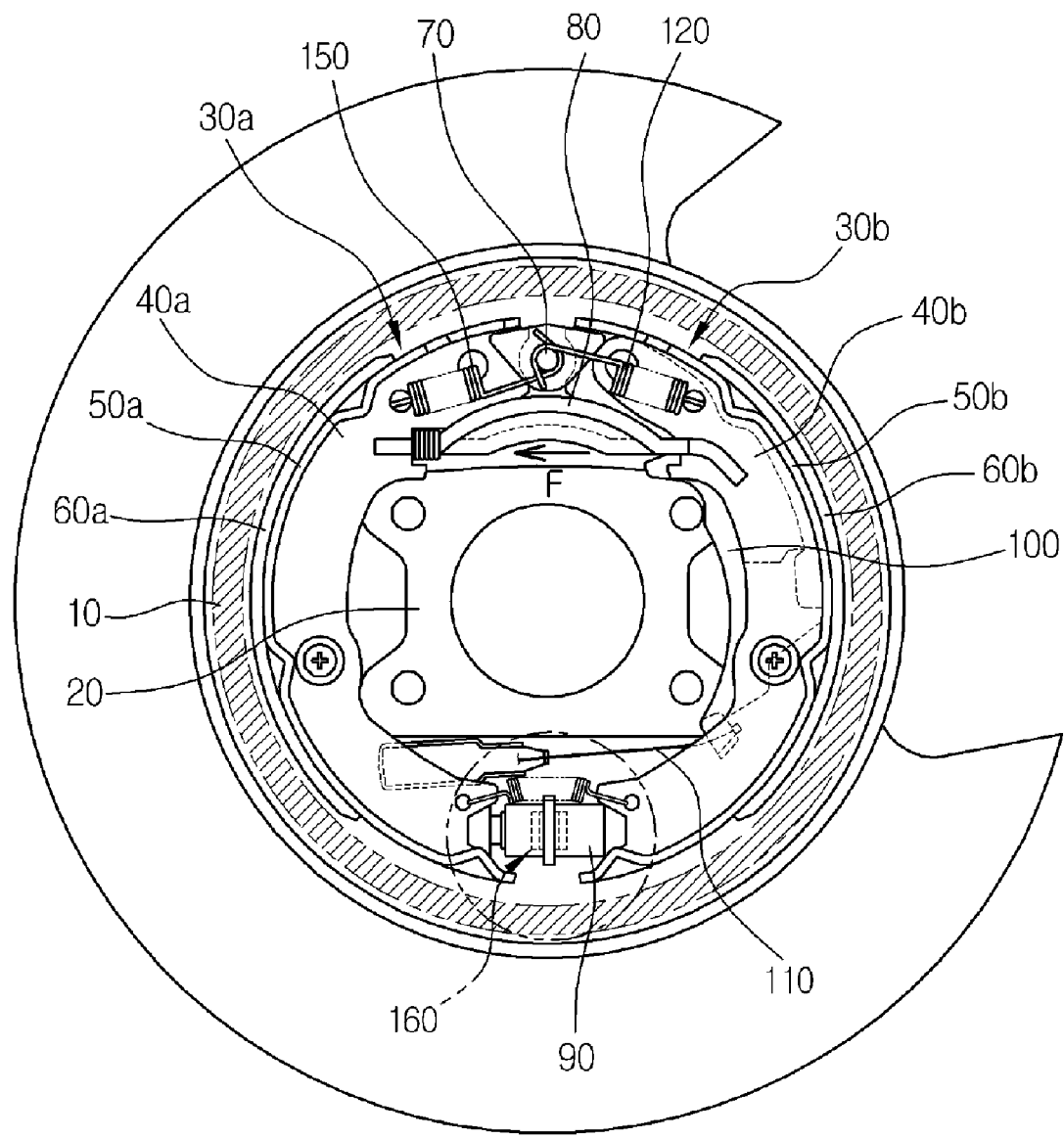
FIG. 2 is a view showing a mechanical drum brake according to an embodiment of the disclosure.

As shown in FIG. 2, a mechanical drum brake according to the disclosure includes a back plate 20 coupled with a vehicle body and a pair of brake shoes 30a and 30b to generate braking force by causing friction from a drum 10 which is mounted on a front surface of the back plate 20 and rotates together with a wheel (not shown).

The brake shoes 30a and 30b are classified into the primary shoe 30a, which is provided in a forward-rotation direction of the drum 10, and the secondary shoe 30b, which is opposite to the primary shoe 30a, about an anchor pin 70. The brake shoes 30a and 30b include rims 50a and 50b having a semicircular shape and having linings 60a and 60b attached thereto and webs 40a and 40b coupled with the inner circumferential surface of the rims 50a and 50b to support the rims 50a and 50b.

The web 40b of the secondary shoe 30b is provided with an actuation lever 100 having one end rotatably coupled with a shaft 120. An opposite end of the actuation lever 100 is linked with a parking brake lever (not shown) provided at one side of a driver seat by using a cable 110. The primary shoe 30a and the actuation lever 100 are connected to each other and supported by a strut 80. Accordingly, if the parking brake lever is pulled, the primary shoe 30a and the secondary shoe 30b are simultaneously driven outward.

An anchor pin 70 is interposed between an end of the web 40a of the primary shoe 30a and an end of the web 40b of the secondary shoe 30b to support the primary and secondary shoes 30a and 30b such that the two brake shoes 30a and 30b are not separated from each other in braking. Return springs 150 are fixed to the webs 40a and 40b of the two brake shoes 30a and 30b about the anchor pin 70. Such returning springs 150 return the two brake shoes 30a and 30b to the initial positions thereof when braking is released.

An adjuster 90 is interposed between an opposite end of the web 40a of the primary shoe 30a and an opposite end of the web 40b of the secondary shoe 30b to connect the opposite ends of the web 40a and the web 40b with each other. In addition, the adjuster 90 compensates for the increase of the gaps between the linings 60a and 60b and the inner circumferential surface of the drum 10 caused by the abrasion of the linings 60a and 60b due to continuous braking.

The adjuster 90 includes a support rod 91, an extensible rod 93 movably inserted into a hollow of the support rod 91, and an adjusting nut 95 coupled with the extensible rod 93. In the adjuster 90, if the adjusting nut 95 is rotated by the operating lever 100, a part of the extensible rod 93 gets out of the support rod 91, so that the gap between the linings 60a and 60b and the inner circumferential surface of the drum 10 is constantly maintained.

In the mechanical drum brake having the above structure, if the parking brake lever provided at one side of a driver seat is pulled in a station state of a vehicle, the end of the actuation lever 100 linked with the parking brake lever through the cable 110 operates, so that the strut 80 is pushed in one direction and one end of the web 40a of the primary shoe 30a is separated from a front end of the anchor pin 70 and pushed to the drum 10, thereby generating braking force. Subsequently, the primary shoe 30a pushes the adjuster 90 to apply reaction force, and the adjuster 90 transfers the reaction force to the secondary shoe 30b. Accordingly, the lining 60b of the secondary shoe 30b causes friction from the inner circumferential surface of the drum 10, so that the braking force is generated.

Figure 3:
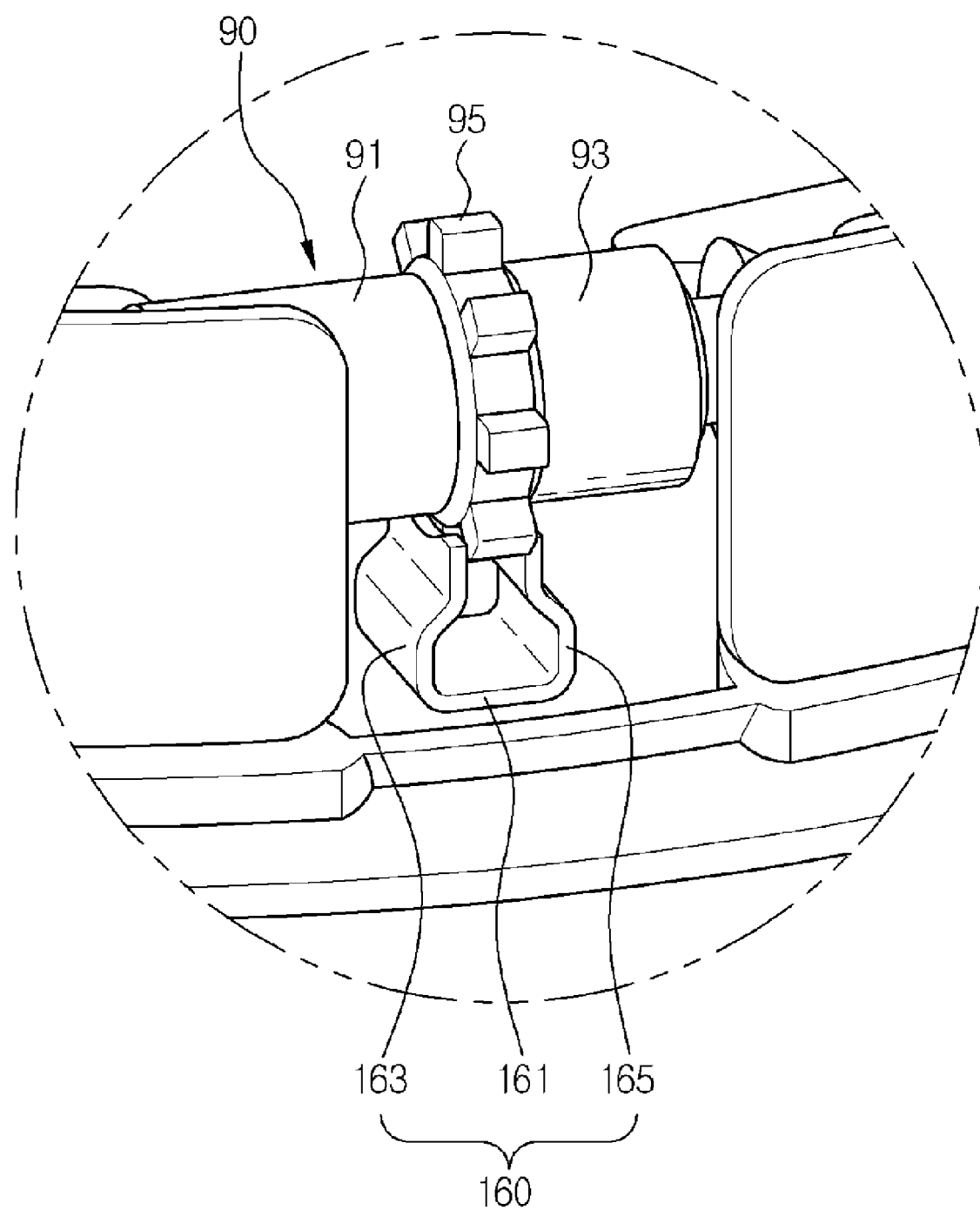
FIG. 3 is an enlarged view showing a part of the mechanical drum brake of FIG. 2.

Meanwhile, according to the embodiment of the disclosure, as shown in FIGS. 2 and 3, an elastic member 160 is provided to smoothly return the positions of the two brake shoes 30a and 30b together with the return springs 150 when braking is released.

The elastic member 160 includes a first member 161 fixed to the back plate 20, and second and third members 163 and 165 extending from both ends of the first member 161 while interposing the adjusting nut 95 of the adjuster 90 between the second and third members 163 and 165. In addition, the elastic member 160 may include a leaf spring as shown in FIG. 3.

In detail, the first member 161 is fixed to the back plate 20 through welding, riveting, and bolt-coupling.

The second and third members 163 and 165 extend from both ends of the first member 161 and face each other while interposing the adjusting nut 95 of the adjuster 90 between the second and third members 163 and 165.

In other words, if the position of at least one of two brake shoes 30a and 30b is biased in one direction after the drum braking has been automatically released, the adjuster 90 making contact with the two brake shoes 30a and 30b, respectively, simultaneously move.

According to the embodiment of the present invention, the adjusting nut 95 of the adjuster 90 moved in one direction as described above is returned to the initial position thereof by using elasticity deformation of the second member 163 or the third member 165 of the elastic member 160.

In addition, if the adjusting nut 95 of the adjuster 90 moving in one direction is returned to the initial position thereof by using elasticity deformation of the second member 163 or the third member 165 of the elastic member 160, the brake shoe biased in one direction are returned to the initial position of thereof.

Therefore, according to the embodiment of the present invention, the brake shoes are smoothly returned to the initial position thereof due to the leaf springs fixed onto the back plate and interposing the adjusting nut therebetween when braking is released.

Although few embodiments have been shown and described, it would be appreciated by those skilled in the art that changes may be made in these embodiments without departing from the principles and spirit of the disclosure, the scope of which is defined in the claims and their equivalents.

What is claimed is:

1. A mechanical drum brake comprising:
a back plate coupled with a body of a vehicle;
a drum provided in opposition to the back plate and rotating together with a wheel;
a primary brake shoe and a secondary brake shoe having a first lining and a second lining, respectively, attached thereto to make contact with an inner surface of the drum for performing a braking operation;
an actuation lever pushing the primary and secondary brake shoes to the inner surface of the drum if a parking cable is pulled;
a return spring to return the primary brake shoe and the secondary brake shoe when the braking operation is released;
an adjuster coupled between the primary brake shoe and the secondary brake shoe; and
an elastic member to return the primary brake shoe and the secondary brake shoe together with the return spring when the braking operation is released,
wherein the adjuster includes an adjusting nut rotated by the actuation lever to maintain a gap between the first and second linings and the inner surface of the drum at a predetermined interval,
wherein the elastic member includes a first member, a second member and a third member, said second member extending from an end of the first member and said third member extending from another end of the first member, said second and third members facing each other while interposing the adjusting nut between the second and third members, and
wherein said first member is fixed to the back plate such that the first member is not movable relative to the back plate during the braking operation.

2. The mechanical drum brake of claim 1, wherein the elastic member is a leaf spring.

3. The mechanical drum brake of claim 1, wherein the first member is fixed to the back plate through at least one of welding, riveting, and bolt-coupling.

4. The mechanical drum brake of claim 1, wherein at least one of the second member and the third member is arranged and configured to be freely movable relative to the first member during the braking operation.

* * * * *